United States Patent [19]
Johnson et al.

[11] 3,881,997
[45] May 6, 1975

[54] METHOD FOR VOLTAMMETRIC DETERMINATION OF NITRATE AND NITRITE

[75] Inventors: Dennis C. Johnson; Ronald J. Davenport, both of Ames, Iowa

[73] Assignee: Iowa State University Research Foundation, Inc., Ames, Iowa

[22] Filed: Mar. 27, 1974

[21] Appl. No.: 455,292

[52] U.S. Cl. .......... 204/1 T; 204/195 R; 210/31 C; 210/38
[51] Int. Cl. ......................................... G01n 27/46
[58] Field of Search ....... 204/1 T, 195 R; 210/31 C, 210/38

[56] References Cited
UNITED STATES PATENTS
3,262,051 7/1966 Payne.............................. 204/1 T OTHER PUBLICATIONS
"Soviet Electrochemistry," Vol. 8, 1972, pp. 914–916.

*Primary Examiner*—T. Tung

[57] ABSTRACT

Nitrate and/or nitrite in water are determined by a cadmium electrode maintained at a critical negative potential and with the test solution at a hydrogen ion concentration favoring the reduction of nitrate and nitrite to hydroxylamine, the detected current being linearly proportional to the nitrate or nitrite concentration. Interfering metal ions are replaced with hydrogen ions by cation exchange, and the nitrate, nitrite, and dissolved oxygen components of the test solution are chromatographically separated in an anion exchange column. For effective separation of the dissolved oxygen and the nitrite, the chromatographic adsorption is preferably made from a solution stream at a lower hydrogen concentration than the hydrogen ion concentration used during the voltammetric determination. The method can be carried out by an analyzer apparatus producing a chromatogram.

10 Claims, 6 Drawing Figures

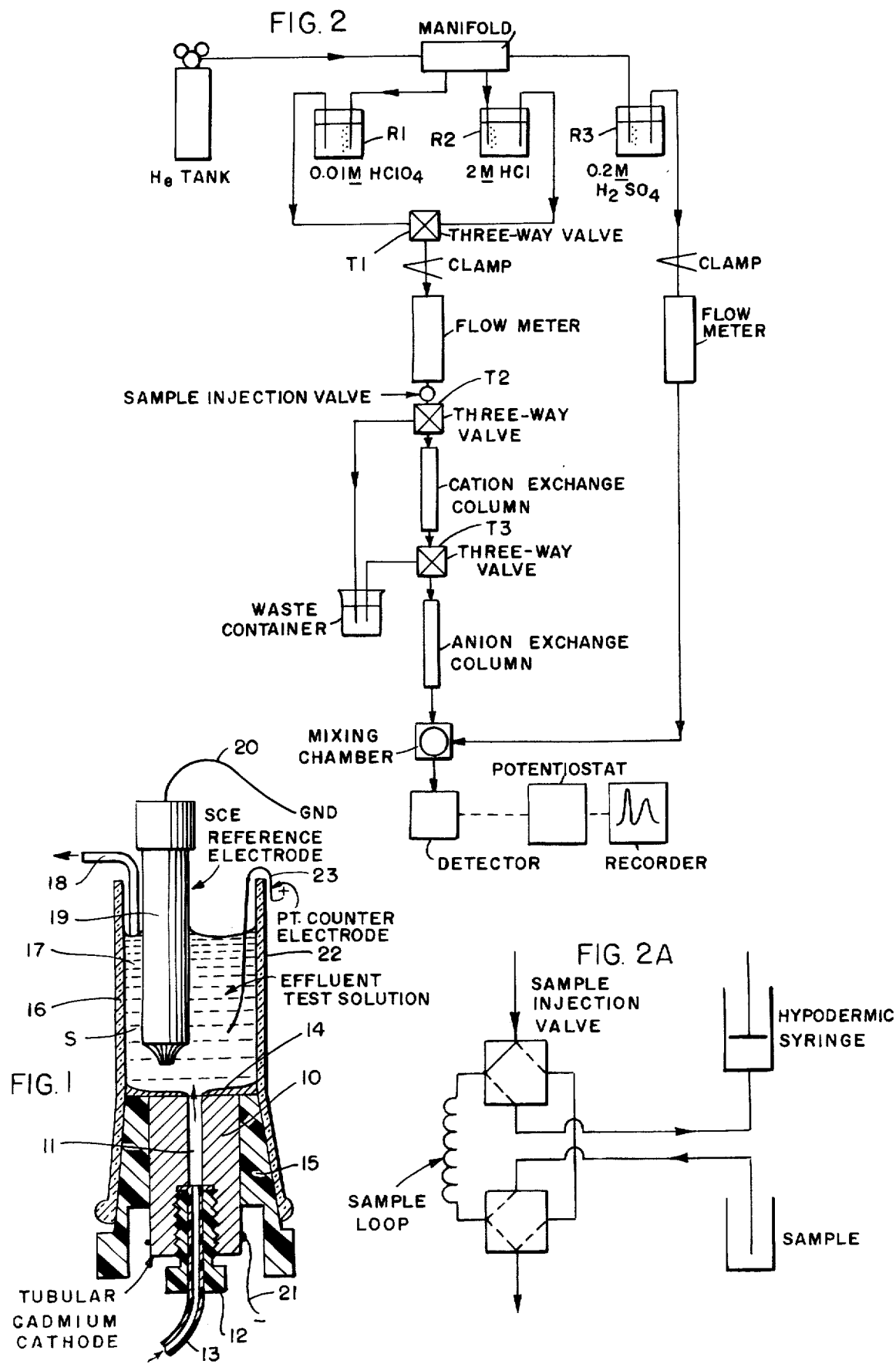

0.50 mM NaNO₃ + 0.50 mM NaNO₂

METHOD FOR VOLTAMMETRIC DETERMINATION OF NITRATE AND NITRITE

BACKGROUND AND SUMMARY

Presently, spectrophotometric methods are commonly used to determine nitrate and nitrate concentrations. Nitrate in the test sample is usually reduced to nitrite and a reagent is added which reacts with the nitrite ions to form colored species. The absorbance by the test solution of light of a particular wavelength is measured and compared to that of standard solutions treated the same way. The total nitrate and nitrite concentration is thereby determined. The nitrite concentration is determined by repeating the process without the reduction step. Then the nitrate concentration is calculated by difference. The precision and accuracy of this method is limited by the reproducibility of the reduction and color-forming procedures. Each analysis requires several minutes for completion and considerable technician manipulation of samples unless the procedure is automated. Oxidizing agents in the sample interfere, and colored or turbid samples are analyzed with difficulty.

Voltammetric procedures are described in the chemical literature for the quantitative determination of $NO_3-$ and $NO_2-$ in aqueous media based on their electrocatalyzed reductions at mercury electrodes in the presence of various di- and trivalent cations. The mechanisms of these electrochemical reactions involve (i) the direct reduction of a complex formed between the cation and the nitrogen species or (ii) the enhancement of the voltammetric wave for the electroreduction of the cation when the reduced form of the cationic species is rapidly oxidized by $NO_3-$ or $NO_2-$ transported to the surface of the electrode by convectivediffusional processes. The uncatalyzed reductions of $NO_3-$ and $NO_2-$ at mercury electrodes are sufficiently irreversible that the large cathodic current due to evolution of $H_2$ obscures any cathodic wave for $NO_3-$ or $NO_2-$.

Direct electrochemical reductions of $NO_3-$ have been studied at a variety of other electrode materials, including Cu, Ti, Au, Pb, Sn(Hg), Cr, and Pt. For none of these electrodes in dilute solutions of $NO_3-$ can analytically useful cathodic waves be resolved from the wave for evolution of $H_2$. Well developed anodic waves for the oxidation of $NO_2-$ to $NO_3-$ at platinum electrodes are observed in the pH range 0.5–8. The process is strongly influenced by the extent of oxidation of the electrode surface. A quantitative method for determining $NO_2-$ by oxidation at a platinum electrode in an acetic acid-acetate buffer has been reported in which controlled-potential coulometry was employed; J. E. Harrar, *Anal. Chem.*, 43,143 (1971). Despite the recognized need for more efficient and reliable method for determining nitrate and/or nitrite in water, the method of Harrar is not known to have been used for commercial analyses.

The voltammetric reduction of nitric acid at a rotating cadmium disk electrode has been reported by Trepak, et al., *Elektrokhimiya*, 8, 939 (1972); trans. *Soviet Electrochemistry*, 8, 914 (1972). The authors studied the reduction as it related to phosphatizing metals. The concentrations of nitric acid studied ranged from 0.2 to 2.0 M. Analytical applications were not discussed.

In the experimental work leading to the present invention, the reduction of nitrate and nitrite in dilute aqueous solutions was studied using a rotating cadmium disk electrode. It was found that the reduction current measured at the disk electrode in the potential range of $-0.85$ to $-1.2$ volts versus a saturated calomel reference electrode was substantially a linear function of nitrate or nitrite concentration below 15 parts per million (ppm) nitrogen. It was also discovered that nitrate and nitrite could be resolved and separated from dissolved oxygen by successive adsorption and elution in a chromatographic cation exchange column. Metal ion interferences are readily removable by cation exchange, the metal ions being replaced by hydrogen ions. Further, where the test solution contains iodide, which would poison the cadmium electrode, it is adsorbed by a strong base anion exchange resin, and is not eluted by eluting agents removing the nitrate and nitrite. Further features of the method and apparatus of the present invention in their preferred embodiments are set out in the following specification.

THE DRAWINGS

FIG. 1 is a cross-sectional elevational view of a cadmium electrode assembly, which may be used in practicing the present invention;

FIG. 2 is a schematic illustration of a complete apparatus for making analytical determinations of nitrate and nitrite in accordance with the present invention;

FIG. 2A is a schematic illustration of a sample injection valve arrangement usable with the apparatus of FIG. 2.

DETAILED SPECIFICATION

Figure 3:
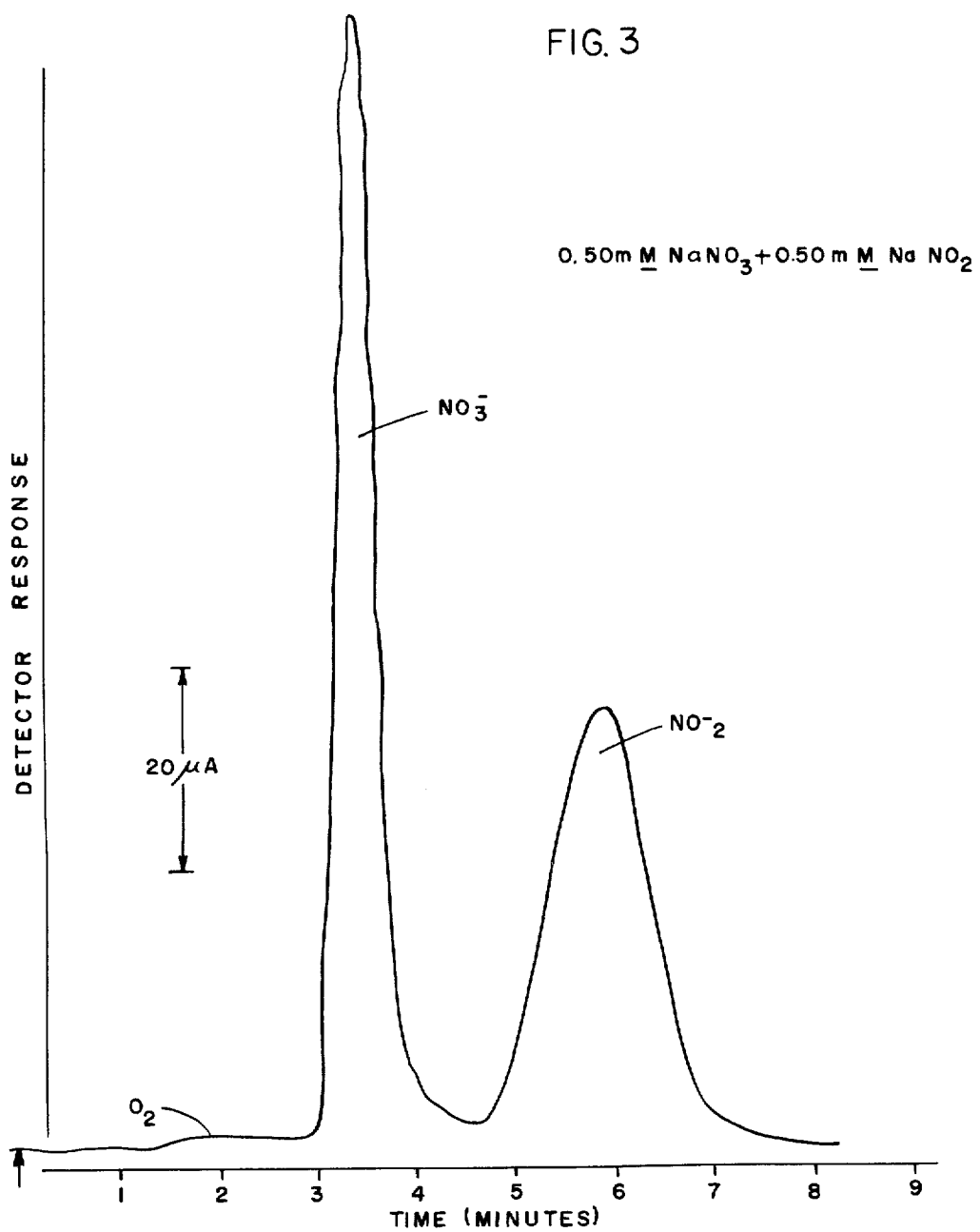
FIG. 3 is a plot of a typical detector measurement of cell current as solutions containing nitrate and nitrite are sequentially passed therethrough.

The method and apparatus of this invention may be employed for determining concentrations of small amounts of nitrate and/or nitrite in water. Determinations can be made within the range of 0.1 to 15 ppm nitrate or nitrite, calculated on the weight of the nitrogen thereof. As indicated, nitrogen oxide ion for which concentration is to be determined may be nitrate ($NO_3-$) or nitrite ($NO_2-$), or a mixture of nitrate and nitrite. The method and apparatus are applicable to the routine analysis of food and water samples in analytical laboratories, where such determinations are desirable because of the toxicity of nitrate and nitrite. For example, the nitrate and/or nitrite content of livestock feed may be analyzed for this purpose. Also, the method is applicable to the determination of nitrate in fertilizers where the nitrate concentration must be known accurately.

An essential feature of the method and apparatus is the use of a cadmium metal electrode. Pure reagent grade cadmium is desirable. The shape and configuration of the cadmium electrode is not critical, and known convenient shapes and configurations for voltammetric analytical measurements can be used. One advantageous configuration is that of a tubular electrode, which adapts itself to monitoring and measuring nitrate and/or nitrite in an aqueous test stream flowing through the tubular passage of the electrode. For batch determinations, a rotating cadmium disk electrode can be used. The electrolytic surface of the cadmium electrode preferably comprises metallic cadmium substantially free of cadmium oxide. Cadmium oxide is not as electrochemically reactive as is a reduced surface of metallic cadmium. Consequently, when the cadmium electrode is not in use, it is desirable to store it in oxygen-free water or in an oxygen-free test solution. In general, air oxidation should be minimized. However, after storage, reactivity of the cadmium electrode surface is restored during electrochemical reduction of the nitrate or nitrite, for example, as will occur after several samples have been run in the detector.

To obtain a linear response, from which the nitrate or nitrite concentration can be readily determined, it is important to maintain the cadmium electrode at a negative potential within a specific range. The desired negative potential of the cadmium electrode in contact with a 0.1 M solution of a strong acid such as sulfuric acid is in the range −0.80 to −1.15 volts measured with reference to a saturated calomel electrode (SCE). As will be understood, the specified voltage range can be converted to other reference electrodes, such as a standard hydrogen electrode. For example, to convert an SCE voltage to a standard hydrogen electrode voltage, it is only necessary to add +0.25 volts. For example, in relation to a standard hydrogen electrode, therefore, the negative potential of the cadmium electrode would be within the range from −0.55 to −0.90 volts.

For optimizing the negative potential of the cadmium electrode, it is desirable to avoid a negative potential so high as to cause hydrogen to be evolved, or a negative potential so low that the cadmium of the electrode anodizes to cadmium ions. Of course, some slight evoluation of hydrogen and/or some slight formation of cadmium ions in unavoidable, but by selecting a negative potential within the range specified above, the amount thereof is negligible. For routine commercial analytical determinations, a particularly desirable potential range is from at least −0.90 down to about −1.05 volts (SCE).

The electrochemical reactions involved in the determination of nitrate and nitrite by the method and apparatus of this invention can be summarized by equations 1 and 2 as set out below:

(1) $NO_3^- + 7H^+ + 6e \rightarrow NH_2OH + 2H_2O$ (2) $NO_2^- + 5H^+ + 4e \rightarrow NH_2OH + H_2O$ As shown by the above equations, both the nitrate and nitrite are reduced in aqueous acidic solutions to hydroxylamine and water. In the detector cell comprising the cadmium electrode, which functions as a cathode, only reactions 1 and 2 occur to any significant extent, and to permit accurate measurement, reactions 1 and 2 are caused to occur separately or sequentially.

Where the aqueous solution to be tested does not contain sufficient hydrogen ions for the hydroxylamine reactions, hydrogen ions should be added. Where metal ions are removed from the test solution to prevent interference by the metal ions during the nitrate or nitrite measurement, a cation exchange column in the hydrogen form may be used. This will result in the replacement of the metal ions with hydrogen ions. Usually, however, it will be desirable to further increase the hydrogen ion content of the test solution by adding small amounts of strong acids, such as sulfuric acid, hydrochloric acid, or other relatively strong inorganic or organic acids. In general, determinations can be made with test solutions in contact with the cadmium electrodes having a hydrogen ion concentration within the range of 0.001 to 5 molar. For routine commercial analyses, a particularly desirable hydrogen ion concentration is from 0.01 to 1.0 molar. For polybasic acids, such as sulfuric acid or phosphoric acid, where only one hydrogen atom readily ionizes, it will be understood that the acid molarity will be substantially the same as the hydrogen ion molarity, as it is with monobasic acids, such as hydrochloride acid or perchloric acid.

Looking now at FIG. 1, there is shown a cadmium electrode assembly, which may be used in the method and apparatus of this invention. A cadmium electrode 10 is in the form of a tube of metallic cadmium having a passage 11 therethrough. While dimensions are not critical, the tube may be approximately ⅞ to 1 inch long, with an outside diameter of about one-half inch. The bore or inside diameter may be approximately one-sixteenth inch. In the illustration given, the lower portion of cadmium tube 10 is bored and tapped to receive a threaded plastic fitting, such as a Kel-F fitting. Fitting 12 receives and is secured to the upper end of a fluid conduit 13, which may be formed of Teflon. In the illustration given, the exposed cylindrical cadmium surface, providing the boundary wall for passage 11, has a length of approximately one-half inch, as previously indicated, a diameter of approximately one-sixteenth inch. The upper end of electrode 10 is covered with a protective material 14, such as paraffin, and the interior free surface of electrode 10, as just described, comprises the active electrode surface for contacting the test solution.

Conveniently, as shown, the electrode 10 is received within an annular plastic plug 15, which may also be formed of Teflon, plug 15 providing a lower end closure for the glass detector cell 16, plug 15 being received into a lower flared end portion of cell 16. As shown, the protective coating of paraffin 14 can extend over the upper end of plug 15 to the adjacent wall portion of cell 16. The upper portion 17 of the cell provides a cup or receptacle for the solution, which may be comprised of the waste column effluent. To control the level of the test solution S within receptacle 17, a vacuum fluid withdrawal tube 18 can be provided. Arranged to extend into the test solution within receptacle 17, there is provided a saturated calomel reference electrode (SCE) 19. Suitable SCE electrodes are available commercially, such as the Beckman SCE electrodes from Beckman Instruments, Inc., Fullerton, California. The SCE electrode 19 is provided with a suitable electrical connection 20, which is connected to a potentiostat, as is the electrical lead 21 from the cadmium electrode. In addition, there is provided a counter electrode, as indicated at 22. The counter electrode may comprise a platinum wire, connected to an electrical lead 23, which in turn is connected to the potentiostat.

In operation, the potential of the cadmium electrode 10 is adjusted with respect to the SCE electrode 19 to maintain a standard uniform voltage, the potential of the cadmium electrode 10 being negative with respect to the SCE electrode 19. The selected negative potential of the cadmium electrode 10 should be in accordance with the values set out above. The test solution S flows upward through fluid conduit 13 and through the passage 11 in electrolytic contact with the tubular cadmium wall of passage 11. More specifically, effluent from the anion-exchange column flows through the conduit 13 and into the cadium tube 11. Solution S fills the glass cell 16 to the level maintained by aspirator tube 18. The storage of waste solution in the glass cell is necessitated by the requirement of simultaneous electrical contact between the reference 19, counter 22, and cadium 10 electrodes. When nitrate ions or nitrite ions are present, part of these ions are reduced to hydroxylamine, resulting in a proportional current flow between electrode 10 and counter electrode 22. Where the potential has been standardized, and the test solution flows through passage 11 at a standardized uniform rate, it is not necessary to convert all of the nitrate or nitrite in the solution stream to hydroxylamine, since the amount converted will be proportional to the concentration. Usually, it will be sufficient to convert only a minor proportion of the nitrate or nitrite to hydroxylamine, such as a conversion of 1 to 10% of the total nitrate or nitrite present in the test solution.

It is surprising that nitrate and nitrite can be reduced to hydroxylamine on a cadmium electrode, and that such an electrode can be used for an analytical determination thereof. Further, as indicated above, it has been discovered that the reduction of both nitrate and nitrite can be controlled so that the resulting current flow is related in a substantially linear proportion to the concentration of nitrate and/or nitrite.

Since most aqueous solutions to be tested for nitrate and/or nitrate will contain certain metal ions, which might interfere with the cathodic reduction of the nitrate or nitrite, it is desirable to remove these metal ions before passing the test solution through the cadmium detector cell. This can be accomplished by passing the test solution through a cationic exchange column in the hydrogen form. For example, a strong-acid (sulfonic) cationexchange resin may be used in a column, the resin being converted to the hydrogen form before being contacted with the sample solution. Metal ions are absorbed by the cationic resin and are replaced with hydrogen ions. The cation exchanger can be regenerated, as is well known in the art, by passing an aqueous acid solution therethrough.

Fortunately, it has been found that most anions commonly present in solutions to be tested did not interfere with the cathodic reduction of the nitrate or nitrite. One exception is iodide, which, if present, will poison the cadmium electrode. However, iodide, if present in the sample, is readily removed during chromatographic separation of the nitrate and nitrite in an anion exchange column, as is desirable for separate analysis of nitrate and nitrite when both are present. Moreover, it has been found that dissolved oxygen may also cause current flow. The oxygen can also be chromatographically separated from nitrite and nitrate in an anion exchange column at the same time as the nitrate and nitrite are resolved. With dilute aqueous acid eluents, adequate separation of the nitrate, nitrite, and dissolved oxygen is readily obtained. The dissolved oxygen emerges from the column first, the nitrite next, and the nitrate last.

Preferably, the anionic exchange column is packed with a strong-base anion-exchange resin, such as a quaternary ammonium resin. Conveniently, the resin may be the perchlorate form, aqueous perchloric acid being used to regenerate the resin, as required. The eluents for the chromatographic separation may comprise aqueous mineral acids, or other aqueous solutions of relatively strong acids. For example, aqueous solutions of the following acids can be used: $HClO_4$, $HCl$, $HBr$, $H_2SO_4$, $H_3PO_4$, etc. Perchloric acid ($HClO_4$) is particularly desirable at a standard concentration of 0.010 M. More generally, $HClO_4$ can be used at concentrations within the range from 0.001 to 0.10 M, as can the other equivalent strong acids. It will be understood, however, that the optimum concentration may vary with the particular acid for substantially total displacement of the nitrate and nitrite.

After the metal ions have been removed from the test solution, being replaced by hydrogen ions, and the nitrate and nitrite components of the test solution chromatographically separated from each other, and form any dissolved oxygen, portions of the test solution containing the nitrate and nitrite can be subjected to the voltammetric determinations of the nitrate and/or nitrite concentrations, as described above. When a detector cell is employed, as shown in FIG. 1, the effluent test solutions will flow at a uniform rate through fluid conduit 13 and into passage 11 in contact with the active surface of the cadmium electrode 10.

Referring now to FIG. 2, an apparatus for practicing the present invention is diagrammatically illustrated. Since the components of the apparatus system are labelled, references will be made thereto by means of the labels shown. As indicated, the cation exchange column, anion exchange column, and detector (which includes the tubular cadmium electrode assembly as shown in FIG. 1) are connected by fluid conduit means, as indicated by the flow lines in the diagram.

It will be understood that the electrical wires or leads from the cadmium, SCE, and counter electrode are connected to the potentiostat, which has a recorder associated therewith. For example, a Beckman Electrocan 30 can be used as a 3-electrode potentiostat and strip chart recorder. However, other 3-electrode potentiostats can be used, either commercial units or ones constructed from commercially available integrated circuits.

An example of a cation-exchange resin which may be used in the cation-exchange column is 80–100 mesh Dowex 50 × 8 strong acid resin in the hydrogen form. The manufacturer of this resin is Dow Chemical Company, Midland, Mich. An example of an anion exchange resin which may be used in the anion exchange column is 180–250 mesh Amberlite IRA-100 strong base resin in the $ClO_4^-$ form. This resin is manufactured by Rohm and Haas Company, Philadelphia, Pa.

As indicated, the solution to be tested may be introduced through a sample injection valve, as shown more clearly in FIG. 2A. For example, the SIV valves of Chromatronix, such as No. SV 8031K, can be used. These valves are manufactured by Chromatronix, Incorporated, Berkley, Calif. For example, a sample volume of 0.33 ml. can be injected.

For operation of the system, it is desirable to provide a source of three reagents, R1, R2, and R3. As shown, R1 is 0.01M $HClO_4$, R2 is 2M $HCl$, and R3 is 0.2M $H_2SO_4$. These reagents are held within closed vessels as indicated, which are connected through a manifold to a source of compressed inert gas. Helium is particularly recommended because of its low solubility in aqueous solutions and relatively low cost. Through a pressure regulator, a suitable pressure, such as about 25 psi, can be applied through the manifold to each of the reagent vessels. The reagent vessels may be made of glass, such as reagent-grade acid glass bottles, each holding 2 liters of solution. The bottles may be capped with suitable plug-type caps, formed from a suitable material such as nylon. The caps may be tapped for attachment of tube-end fittings for the flexible tubes extending to the manifold. The flexible tubes may be made of Teflon. The solutions R1 and R2 may be selectively supplied through a three-way valve T1. Downstream of valve T1, a screw clamp may be provided, for flow control and also a flow meter ahead of the sample injection valve. It is also desirable to provide a three-way valve T2 between the sample injection valve and the cation-exchange column, valve a discharge having a discharge connection to a waste container. A three-way valve T3 is conveniently provided between the cation exchange column and the anion-exchange column, the valve having a discharge connection to a waste container.

For adjustment of the hydrogen ion concentration of the test solution, after it has been passed through the cation and anion-exchange columns, a mixing chamber may be provided as shown, and the mixing chamber may be connected to the reagent vessel R3. A suitable mixing chamber is model MC from Pine Instruments Company, Grove City, Pa. In the conduit from reagent R3 to the mixing chamber, it is convenient to provide a clamp and flow meter as shown. From the mixing chamber, the prepared test solution passes through the detector, where it is analyzed in the tubular cadmium cathode constructed as shown in FIG. 1.

In operating the apparatus, as shown in FIG. 2, the solutions in each of the reagent tanks, R1, R2 and R3 may be deaerated by bubbling helium therethrough. This need not be done each time the chromatograph apparatus is used, if the tanks are sealed so that air does not enter them when they are not in use.

After sealing, the reagent tanks R1, R2 and R3 are pressurized with helium to about 25 psi. After being pressurized, the flow rates of the 0.01M $HClO_4$ eluent and the 0.2M $H_2SO_4$ electrolyte are adjusted to approximately 0.2 ml./min. Excess or waste effluent can be removed from the detector cell receptacle 17 be means of a tube, such as tube 18, connected to an aspirator. This tube may be inserted as required and extended to the bottom of the receptacle 17 for complete removal of the effluent. Sufficient waste effluent solution must be maintained in the detector cell 16 during operation to provide the simultaneous and necessary ionic contact between reference electrode 19, counter electrode 22 and cadmium detector 10.

Any bubbles of helium in the eluents stream may be eliminated through the first three-way valve T1. The flow of eluent and electrolyte are allowed to stabilize.

The leads from the potentiostat are connected to the SCE, counter electrode, and cadmium electrode. The potentiometer is balanced, and the working electrode potential is adjusted to —0.90V vs. SCE. The potentiostat is turned on. The recorder chart's feed and current sensitivity are adjusted to the desired value.

To shut down the chromatograph apparatus, the flow of eluent and electrolyte may be stopped by tightening the flow control clamps. Screw clamps should also be attached and tightened on the tubes running from the manifold to either of the reagent tanks in order ro prevent mixing solutions. The helium pressure regulator is turned off, and each of the reagent tanks is opened to release the internal pressure. However, if the chromatograph apparatus is to be used soon again, the tanks may be left pressurized, and only the flow of the eluent and electrolyte stopped. The potentiostat is turned off. Next, there may be removed the SCE, counter electrode, and aspirator tube from the detector cell. The cell may be covered to prevent rapid evaporation of the effluent in it. The remaining liquid should completely cover the tubular electrode. The water running through the aspirator should be turned off.

The apparatus as described may be altered for specific applications. If the samples to be analyzed contain no electroactive cations, then the cation-exchange column, the reagent tank R2, and the two 3-way valves T1 and T3 can be eliminated. Should the test solutions contain large quantities of non-ionic electroactive species (such as $SO_2$) or organic molecules, which would deposit on the electrode surface by adsorption, they can be eliminated by using an additional column in the effluent stream. This column would contain a nonionic resin to adsorb the nonionic molecules and prevent their interference.

Preferably, the detector sensitivity is maximized by adjusting the acidity of the effluent in the mixing chamber. However, if this sensitivity adjustment is not desired, the third vessel R3, the mixing chamber, and the related flow meter can be eliminated.

For regeneration of the cation-exchange column, the reagent from vessel R2, the 2M HCl, is passed through the column with valves T1 and T2 open, and valve T3 connected to discharge the regenerating solution to a waste container. As will be understood, the anion-exchange column will be regenerated by the eluent solution, as it is supplied thereto from reagent vessel R1. The flow of the 0.01M $HClO_4$ eluent can be continued before shutting down the apparatus until the anion-exchange column is completely in the $ClO_4^-$ form.

The relationship between I, the current measured in a smooth tubular electrode during continuous flow of an electroactive species through it, and the flow rate is given by Blaedel, et al., Anal. Chem., 35, 2100 (1963).

$$I = 5.24 \times 10^5 D^{2/3} L^{2/3} n V_f^{1/3} C^b \tag{I}$$

where:
D = diffusion coefficient of electroactive species
L = tube length
n = equivalents per mole
$V_f$ = volumetric flow rate
$C^b$ = bulk concentration of electroactive species.

The peak area, Q, obtained from a single injection of an electroactive species into a stream of electrolytic solution flowing at a constant rate through a tubular electrode is $$Q = 5.24 \times 10^5 D^{2/3} L^{2/3} n V_f^{-2/3} \text{ [moles]} \tag{II}$$

where [moles] = number of moles of the electroactive apecies injected.

It can be seen from Equation II that the detector sensitivity is not dependent on the tube inner diameter, but is dependent on its length. The flow rate also affects the peak areas. Therefore, to achieve maximum precision in the determination of unknown concentration, the flow rate must be maintained constant.

Figure 4:
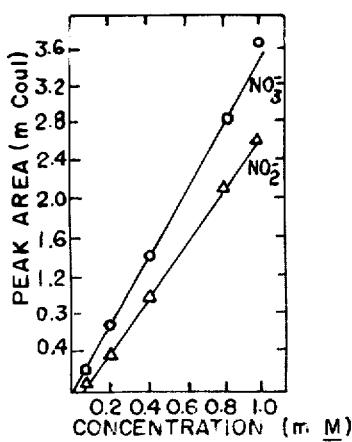
FIG. 4 is a plot of peak areas versus nitrate and nitrite concentration, which may be used in determining concentration by reading and computing the peak areas.
Figure 5:
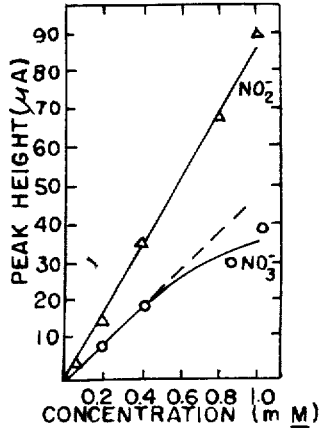
FIG. 5 is a plot of peak heights versus nitrate and nitrite concentration, which may be used in determining concentration by reading peak heights.

A typical chromatogram of a solution containing 0.500mM NaNO$_2$ and 0.500mM NaNO$_3$ is shown in FIG. 3. An apparatus similar to that of FIGS. 1 and 2 was used to record this chromatogram. The flow rates of 0.01M HClO$_4$ eluent and 0.2M H$_2$SO$_4$ were each 0.2ml/min. The detector was potentiostated at −0.90 V vs. SCE. As shown in FIG. 4, the peak areas of the nitrate and nitrite peaks are linear with respect to concentration over the concentration range studied. Peak heights are more quickly measured than peak areas, and may be used to calculate concentrations. However, the relationship between nitrate peak height and concentration, shown in FIG. 5, is not entirely linear.

Use of the method and apparatus as described herein for determination of nitrate and nitrite ion concentrations in aqueous samples offers marked advantages over presently accepted spectrophotometric methods. Much greater speed and convenience in the analysis are provided, and the instrumental design with the electrical detection will facilitate complete automation for repetitive sampling and analysis of liquids. Moreover, analytical results of higher precision and accuracy are obtainable even by relatively unskilled technicians.

We claim:

1. The voltammetric method of determining the concentration of small amounts of nitrate and/or nitrite in water, characterized by the steps of:
   a. maintaining a cadmium electrode at a negative potential in the range of −0.80 to −1.15 volts with reference to a saturated calomel electrode;
   b. contacting an aqueous test solution with said cadmium electrode, said solution containing up to about 15 ppm nitrogen as an unknown concentration of nitrate and/or nitrite, said solution having a hydrogen ion concentration in the range of 0.001 to 5 molar favoring the reduction of said nitrogen oxide ion to hydroxylamine; and
   c. detecting the current flow between said cadmium electrode and a counter electrode in contact with said test solution.

2. The method steps of claim 1 further characterized in that said cadmium electrode is maintained at a constant negative potential in the range of −0.90 to −1.05 volts with reference to a saturated calomel electrode.

3. The method steps of claim 1 further characterized in that said test solution has a hydrogen ion concentration of 0.01 to 1.0 molar.

4. The method steps of claim 1 further characterized in the said cadmium electrode is in the form of a tube and said test solution is passed continuously at a uniform rate through said electrode tube.

5. The voltammetric method of determining the concentration of small amounts of nitrate and/or nitrite in water, characterized by the steps of:
   a. maintaining a cadmium electrode at a negative potential in the range of −0.90 to −1.05 volts with reference to a saturated calomel electrode;
   b. contacting an aqueous test solution with said cadmium electrode, said solution containing up to about 15 ppm nitrogen as an unknown concentration of nitrate and/or nitrite, said solution having a hydrogen ion concentration from 0.01 to 1.0 molar; and
   c. detecting the current flow between said cadmium electrode and a counter electrode in contact with said test solution.

6. The method steps of claim 5 further characterized in that said calmium electrode is in the form of a tube and said test solution is passed continuously at a uniform rate through said electrode tube.

7. The voltammetric method of determining the concentration of small amounts of nitrate and/or nitrite in water, characterized by the steps of:
   a. maintaining a cadmium electrode at a constant negative potential in the range of −0.90 to −1.05 volts with reference to a saturated calomel electrode, said cadmium electrode being in the form of a tube;
   b. passing an aqueous test solution at a constant flow rate through said tubular cadmium electrode, said solution containing up to about 15 ppm nitrogen as an unknown concentration of nitrate and/or nitrite, said solution having a hydrogen ion concentration in the range of 0.001 to 5 molar favoring the reduction of said nitrogen oxide ion to hydroxylamine; and
   c. detecting the current flow between said cadmium electrode and a counter electrode in contact with said test solution.

8. In a method of determining the concentration of small amounts of nitrate and/or nitrite in an aqueous test solution containing metal ions and dissolved oxygen, the steps comprising:
   a. removing the metal cations from said test solution and replacing them with hydrogen ions;
   b. chromatographically separating said nitrate, nitrite, and oxygen components by successive adsorption and elution in a column of a strong cation exchange resin to provide an eluent containing up to about 15 ppm nitrogen as an unknown concentration of nitrate and/or nitrite; and
   c. voltammetrically determining the concentration of the separated nitrate and/or nitrite in the eluent by flowing said eluent through a tubular cadmium electrode maintained at a negative potential in the range of −0.80 to −1.15 volts with reference to a saturated calomel electrode.

9. The method steps of claim 8 in which said voltammetric determination is carried out at a hydrogen ion concentration in said tubular electrode of 0.01 to 1.0 molar.

10. The method steps of claim 8 in which said cadmium electrode is maintained at a constant negative potential in the range of −0.90 to −1.05 volts.

* * * * *